United States Patent [19]
Cox, Jr.

[11] Patent Number: 4,593,795
[45] Date of Patent: Jun. 10, 1986

[54] INCLINED DISC BRAKE ASSEMBLY

[76] Inventor: Frank T. Cox, Jr., Imperial Southgate Villa #111, Lakeland, Fla. 33803

[21] Appl. No.: 490,522

[22] Filed: May 2, 1983

[51] Int. Cl.⁴ ............................................. F16D 55/04
[52] U.S. Cl. ................... 188/71.3; 188/70 R; 188/72.3; 188/72.7; 192/70.15; 192/70.23; 192/70
[58] Field of Search ............... 188/70 R, 70 B, 71.3, 188/71.4, 72.1, 72.7, 72.3, 73.39, 71.1, 216; 192/70.15, 65, 70, 70.23

[56] References Cited

U.S. PATENT DOCUMENTS

| | | | |
|---|---|---|---|
| 1,437,412 | 12/1922 | Girling | 192/70 X |
| 2,038,608 | 4/1936 | Sauzedde | 188/71.3 X |
| 2,184,506 | 12/1939 | Eason | 192/70.15 X |
| 2,254,592 | 9/1941 | Berkeley | 192/70 X |
| 2,346,480 | 4/1944 | Freer | 188/71.4 |
| 2,352,829 | 7/1944 | Forbes | 188/71.4 X |
| 2,903,099 | 9/1959 | Nelson | 188/75 |
| 3,033,320 | 5/1962 | Edwards | 188/70 R |
| 3,086,620 | 4/1963 | Elfes | 188/75 |
| 3,146,859 | 9/1964 | Schmid | 188/70 R |
| 3,167,158 | 1/1965 | Brownyer | 188/141 |
| 3,311,198 | 3/1967 | Rise | 188/75 |
| 3,342,290 | 9/1967 | Klaue | 188/71.3 |
| 3,344,893 | 10/1967 | Pelikan | 188/58 |
| 3,357,524 | 12/1967 | Smith | 188/73.39 X |
| 3,543,285 | 11/1970 | Frigger | 188/72.7 X |
| 3,547,229 | 12/1970 | Pollinger et al. | 188/72.7 X |
| 3,584,710 | 6/1971 | Frohlich | 188/216 X |
| 3,780,835 | 12/1973 | Harrison | 188/74 |
| 3,952,841 | 4/1976 | Pringle | 188/72.3 X |
| 4,030,576 | 6/1977 | Pringle | 188/72.3 X |
| 4,164,993 | 8/1979 | Kobelt | 188/71.6 |

FOREIGN PATENT DOCUMENTS 405958  5/1934  United Kingdom ............... 188/71.3

Primary Examiner—George E. A. Halvosa
Attorney, Agent, or Firm—Steven L. Permut

[57] ABSTRACT

An inclined disc brake assembly has a rotor 12 comprising two halves 32 and 34 clamped together. The rotor 12 has inclined braking surfaces 22 and 24 opposing each other forming a wedged channel 26 therebetween. A brake housing 16 is anchored to an axle housing 18 and has two torque receiving sections 60 with opposing spaced walls 62. Brake shoes 62 and 66 having inclined lining surfaces and inclined backing plates 76 and 78. The plates are mounted within horizontal grooves 82 in the anchored section 60 for horizontal movement. An actuating wedge 84 is moved downwardly by an actuator assembly 20 to spread the brake shoes apart and into engagement with the braking surfaces 22 and 24 of the rotor.

9 Claims, 5 Drawing Figures

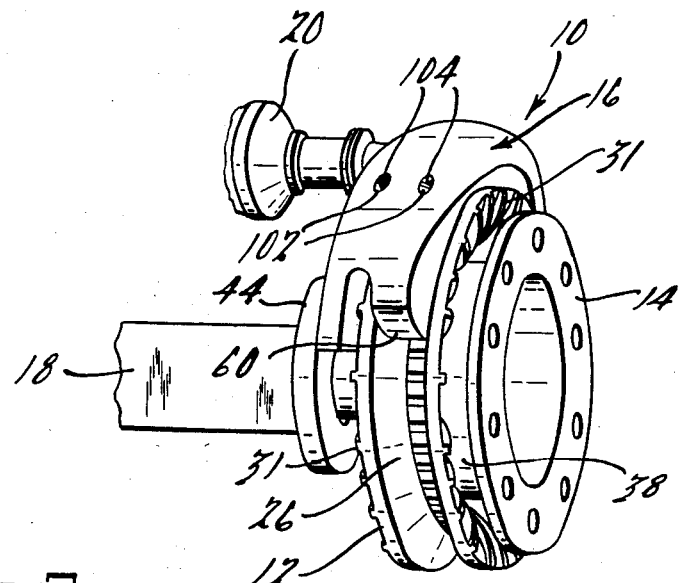
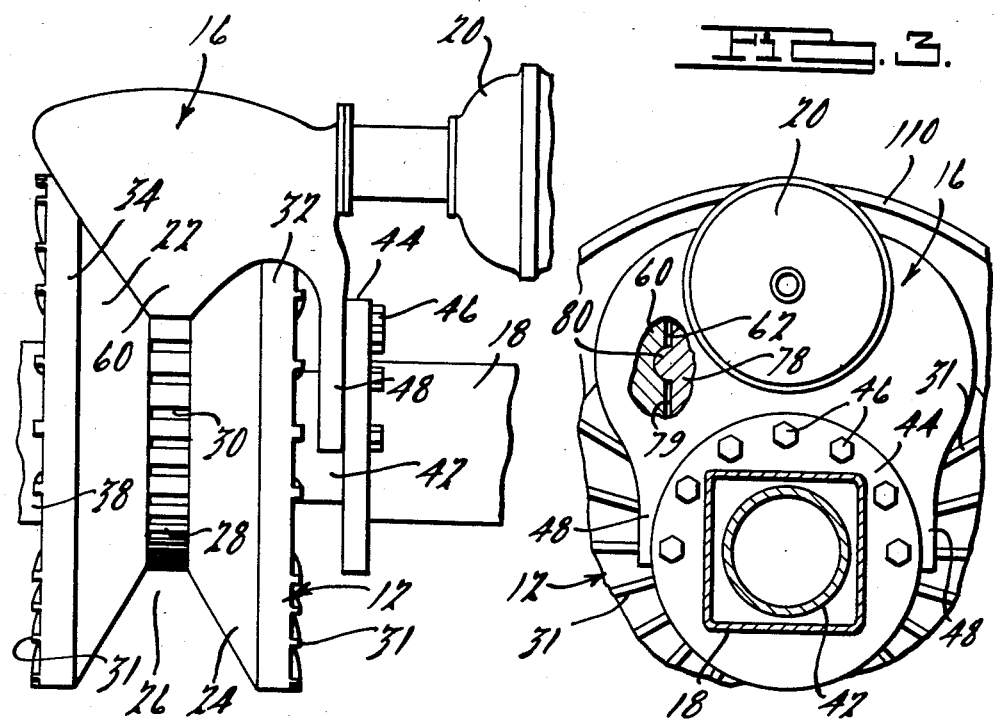

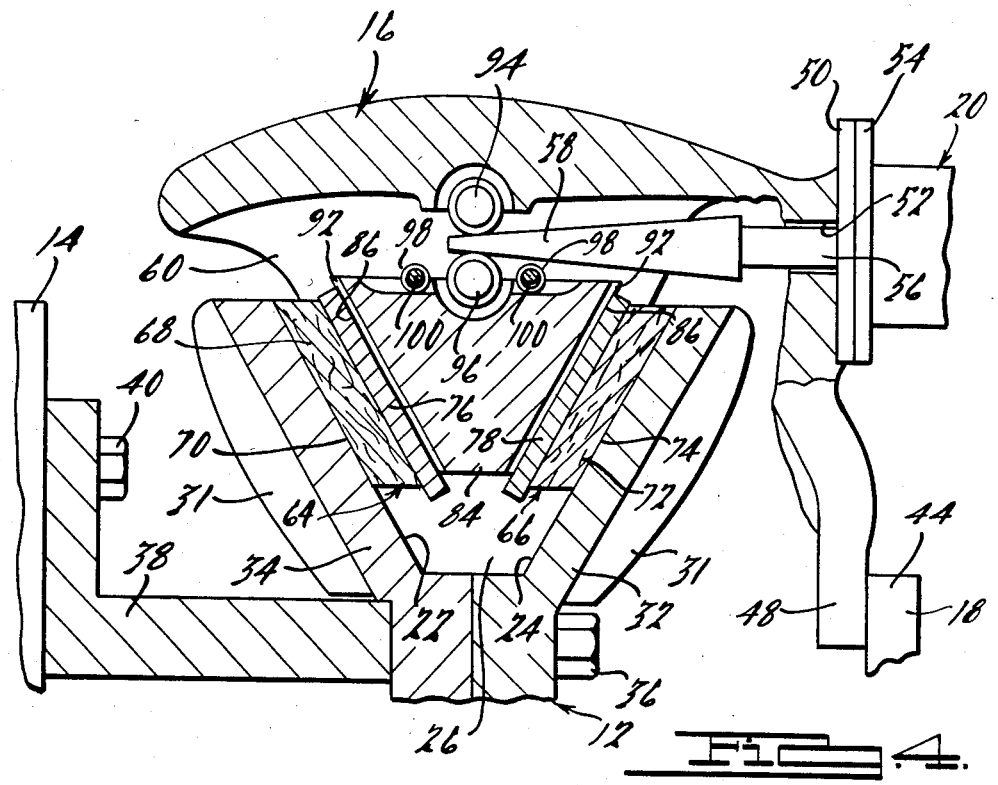
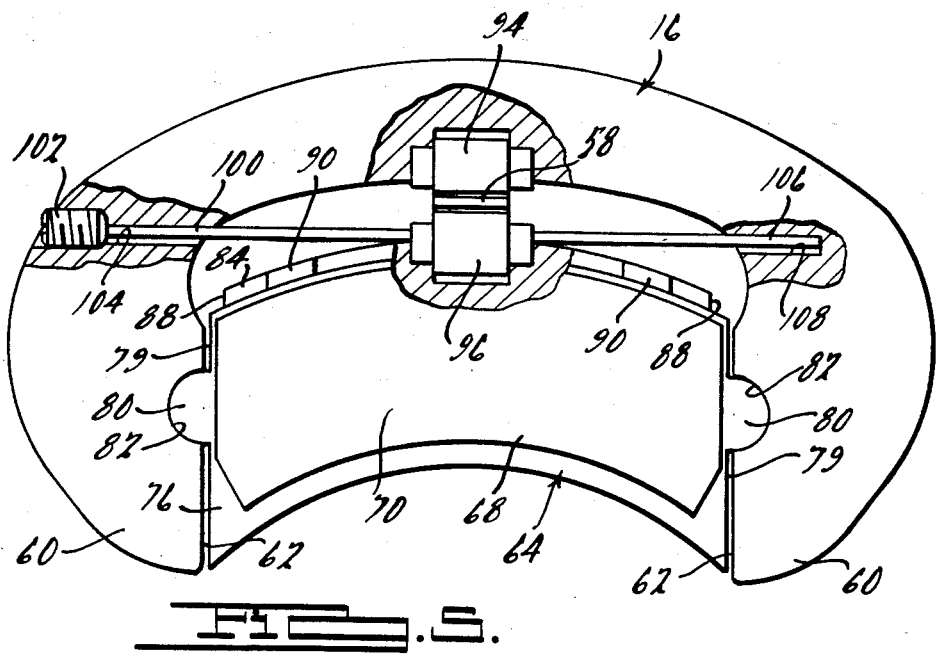

INCLINED DISC BRAKE ASSEMBLY

TECHNICAL FIELD

This invention relates to a brake assembly for motor vehicles and more particularly to an inclined disc brake assembly.

DISCLOSURE INFORMATION

Disc brake assemblies commonly include a rotor with brake shoes mounted adjacent the rotor, an actuating mechanism, for example, a caliper for forcing the brake shoes against the rotor and an anchored member for absorbing the torque transmitted from the rotor. Inclined disc brakes are preferably in heavy duty applications because each canted braking surface of the rotor allows the actuator to increase the pressure of the shoe and shoe lining against the rotor thereby increasing the output torque of the brake assembly.

However, conventional inclined disc brakes have several drawbacks. Firstly, conventional inclined disc brakes cannot be substituted as replacement parts in vehicles which are originally designed for drum brakes. Secondly, the brake linings have always been attached to the actuating wedge such that when the brake linings become worn, the actuating wedge and linings must move closer to the axis of rotation of the roter before effective braking occurs. As this inward movement occurs, the effective radius of the brake decreases thereby lowering torque output of the brake.

It is desirable to have an inclined disc brake assembly which maintains the same torque output throughout the effective life of the brake shoe and can be easily substituted for drum brake assemblies without major reconstruction of the hubs, wheels, spindles, axle housing, air systems, and emergency brake units of the motor vehicle.

SUMMARY OF THE INVENTION

According to the invention, an inclined disc brake assembly for a motor vehicle include a housing member anchored to an outer end of an axle housing and a rotor fixedly secured to a vehicle wheel that is mounted to an axle. The axle is rotatably mounted within the axle housing. The rotor has opposing first and second canted braking surfaces that face radially outward. The canted braking surfaces form a wedged shaped annular channel. The housing member has two circumferentially spaced and radially inwardly extending depending sections which intrude into the wedged shaped annular channel.

First and second brake shoes are positioned between the depending sections of the brake housing for sliding motion in a direction parallel to the axis of rotation of the rotor. The first and second brake shoes have canted outer frictional surfaces facing and parallel to the respective first and second canted surfaces of the rotor. The first and second brake shoes also have canted back-up plates. An actuator wedge having canted opposite sides is interposed between the canted back-up plates of the brake shoes. An actuating mechanism attached to the brake housing moves the actuator wedge radially inward such that the sides of the actuator wedge abut and slide against the back-up plates of the brake shoes and forces the brake shoes apart in opposite horizontal directions whereby the outer frictional surfaces of the shoes engage the canted braking surfaces of the rotor.

A spring wire extends between the two depending sections of the brake housing. The actuator wedge is attached to the spring wire and is biased radially outwardly to allow the brake shoes to disengage from the rotor.

The rotor and assembled housing shoes and actuator wedge are positioned within a tire rim connected to the vehicle wheel.

A broader aspect of the invention relates to an inclined disc brake assembly having a rotor with canted first and second braking surfaces. An anchor housing slidably mounts the first and second brake shoe for braking engagement with the respective braking surfaces. An actuator slides the first and second brake shoes in opposite directions parallel to the axis of rotation of the rotor for engagement with the canted braking surfaces of the rotor.

An inclined disc brake according to the invention has its brake shoes engaging the inclined disc at the same radial position independent of the wear of the brake linings. The constant radial position provides for a constant torque output throughout the effective life of the brake shoes.

In addition, the inclined disc brake assembly according to the invention can be packaged in the space provided within a tire rim and allows replacement of conventional drum and disc brake assemblies without major reconstruction of the axle.

In addition, the actuator wedge, brake shoes, and brake housing do not require sealed parts or more than ordinary protection from the environment normally encountered by disc brakes.

BRIEF DESCRIPTION OF THE DRAWINGS

Reference now will be made to the accompanying drawings in which:

FIG. 1 is as front perspective view of an inclined disc brake assembly in accordance with the invention;

FIG. 2 is a rear elevational view of the inclined disc brake assembly shown in FIG. 1;

FIG. 3 is a fragmentary and partially segmented side elevational view of the inclined disc brake assembly shown in FIG. 1;

FIG. 4 is an enlarged rear elevational and segmented view of the inclined disc brake shown in FIG. 1;

FIG. 5 is a side elevational and partially segmented view of the brake housing with the brake shoes and actuator wedge.

DETAILED DESCRIPTION OF THE PREFERRED EMBODIMENT

Referring to FIG. 1, a disc brake assembly 10 includes a rotor 12 attached to a vehicle wheel hub 14, a housing 16 anchored to an axle housing 18, and an actuator assembly 20 is operably connected to the brake housing 14.

Referring now to FIGS. 2 and 4, the rotor 12 has two inclined and opposing braking surfaces 22 and 24 which form an annular wedged shaped channel 26 therebetween. The center portion 28 of the rotor may have ventilation slots 30 to facilitate cooling. The outer side may have a plurality of cooling fins 31. For ease in manufacturing, the rotor 12 may be made from two halves 32 and 34 that are bolted together via a fastener 36. Fastener 36 also secures the rotor 12 to an adaptor 38 which in turn is bolted via fasteners 40 to the wheel hub 14. The wheel hub 14 is conventionally secured to axle 42 which is rotatably mounted within the axle housing 18.

As shown in FIGS. 3 and 4, the brake housing 16 has two arcuate depending legs 48. The legs 48 are anchored to an outer flange 44 of the axle housing 18 by fasteners 46. The brake housing 16 has an upper flange 50 with an aperture 52 therethrough. The flange 50 is connected to a complementary flange 54 of actuator 20. The actuator controllably moves shaft 56 reciprocally through aperture 52. Shaft 56 is connected to an operating wedge 58.

Referring now to FIGS. 4 and 5, the housing 16 has two downwardly depending torque receiving sections 60 which intrude into the channel 26. Each torque receiving section 60 has a vertical wall 62. The walls 62 are spaced apart to receive a pair of brake shoes 64 and 66 therebetween. Brake shoe 64 has a liner 68 with an inclined outer surface 70 adjacent braking surfaces 22 of rotor 12. Similarly, braking shoe 66 has a liner 72 with an outer surface 74 adjacent braking surface 24 of rotor 12. In addition, each brake shoe 64 and 66 has a back-up plate 76 and 78 which is also in an inclined position. At opposite ends 79 of each back-up plate 76 and 78 are tabs 80 which are slidably received in horizontal grooves 82 in walls 62 to facilitate axial movement of the brake shoes into and out of engagement with the braking surfaces 22 and 24 of rotor 12. Other variations to slidably mount the shoes onto the anchor plate onto the brake housing are possible. For example, the backing plates may have, instead of tabs 80, grooves that are aligned with grooves 82. Steel pins can be interposed between the aligned grooves. In addition, the brake shoes can be mounted by resilient pins which radially compress under torque loads to allow the ends 79 of the back-up plates 76 and 78 to abut one of the walls 62 when brake torque is exerted.

An actuator wedge 84 is interposed between the brake shoes 64 and 66. The wedge 84 has two ends 88 opposing walls 62. The actuator wedge 84 also has canted surfaces 86 adapted to abut the canted back-up plates 76 and 78. More specifically as shown, each side surface 86 has raised side strips 90, and a center raised strip 92 which abut the back-up plates 76 and 78 with the remainder of the side surface 86 recessed from the back-up plates.

The brake shoes 64 and 66 and actuator wedge 84 are all constructed with an arcuate configuration corresponding to the distance away from the axis of rotation of the rotor 12. The angles of the canted surfaces should be measured with respect to the center of rotation of the rotor 12 and not through vertical cross-sections in the direction of strips 90, 94 and 92. Consequently, if a vertical cross-section is taken through strips 92 and 92, the wedge has a different angle at each strip. However, if a cross-section is taken along the radial direction, the cross-sections should appear to have equal angles.

A pair of cylindrical roller bearings 94 and 96 are rotatably mounted in the housing 16 and actuator wedge 84 respectively. The rollers 94 and 96 roll on the operator wedge 58. The rollers are mounted to be secured against any translational movement independent of the translational motion of the housing 16 and wedge 84.

In addition, the wedge 84 has two screw eyes 98 connected to a radially outer side thereof for receiving a pair of spring wires 100. Each spring wire 100 has a threaded end 102 secured in an aperture 104 in the housing 16. Opposite end 106 of each wire 100 ends in a blind hole 108 in housing 16.

In operation, when the actuator assembly 20 is actuated, it pushes out shaft 56 therefrom which thrusts operating wedge 58 inbetween the rollers 94 and 96. Roller 96 and wedge 84 are forced downwardly. As wedge 84 is moved downwardly, the brake shoes 64 and 66 are forced in axially opposite horizontal directions until linings 68 and 72 engage against the braking surfaces 22 and 24. Brake torque is transferred from the rotor 12 to the brake shoes 64 and 66. The brake shoes transfer the brake torque to the housing by abutting one of the walls 62 of the depending sections 60. The brake housing 16 resists rotation since it is securely anchored onto the flange 44 of axial housing 18. When the brakes are deactuated, the wedge 58 is withdrawn and tension spring 100 upwardly biases the wedge 84 to allow the brake shoes 64 and 66 to disengage from the rotor 12.

As the brake lining 68 and 72 become worn through normal wear, the brake shoes, when actuated, merely slide further apart. The braking surfaces 70 and 74 maintain the same radial position where they engage the brake surfaces 22 and 24. The position of the brake shoes is maintained by the grooves 82 and tabs 80. In other words, the brake shoes 64 and 66 do not recede into the channel 26 as the brake shoes become worn.

In addition, the inclined surfaces 22 and 24 of the rotor 12 allow the actuator 20 to apply the brake shoes thereon with greater pressure than on a normal vertical rotor. Furthermore the rotor 12, brake housing 16 and actuator 20 can be positioned in the normal position within the tire rim 110 as shown in FIG. 3 without reconstruction of the axle 18 or wheel hub 14.

Furthermore, the actuator wedge 84 and brakes shoes 64 and 66 require no specialized protection from the elements.

The return of the wedge 84 is provided by the simple but effective tension wires 100 which function as return springs.

The actuator 20 can be an air chamber or use hydraulic fluid. In addition, the brake assembly can use conventional spring supplied emergency and parking units presently available on the market.

In addition, the strips 90 and 92 can be coated with low friction material to lower the friction between the wedge 84 and the brake shoes 64 and 66.

In addition, under certain circumstances it may be desirable to have two brake housings mounted on the axle housing in diametrical opposition whereby two sets of brake shoes act upon the rotor.

Variations and modifications of the present invention are possible without departing from its scope and spirit as defined by the appended claims.

The embodiments of the invention in which an exclusive property or privilege is claimed are defined as follows:

1. A brake for a motor vehicle comprising:
   a brake housing anchored to an outer end of an axle housing;
   a rotor fixedly secured to a vehicle wheel, said wheel is mounted to an axle that is rotatably mounted within said axle housing;
   said rotor having opposing first and second braking surfaces that are radially outwardly facing and canted with respect to the plane transverse to the axis of rotation of said rotor such that they diverge from each other forming a wedged shape annular channel therebetween;

said anchored housing having means for mounting first and second brake shoes for sliding motion in a direction parallel to the axis of rotation of said rotor;

said housing constructed to receive torque exerted on said brake shoes by said rotor;

said first and second brake shoes having canted outer frictional surfaces facing respective first and second surfaces of said rotor and having canted opposing inner surfaces;

an actuator wedge having canted opposite sides, said wedge interposed between said canted inner surfaces of said first and second brake shoes;

means for moving said wedge radially inwardly such that said canted sides of said wedge abut and slide against the inner surfaces of said first and second brake shoes to move said first and second brake shoes apart in opposite directions whereby said canted outer frictional surfaces engage said braking surfaces of said rotor; and a spring wire being mounted at its ends to said brake housing and being operably connected to said wedge for returning said wedge to a radially outer position to allow said brake shoes to disengage from said rotor.

2. A brake as defined in claim 1 wherein:

said brake housing has two spaced torque receiving sections extending into said wedged shaped annular channel; and said brake shoes and said actuator wedge are interposed between said two spaced torque receiving sections.

3. A brake as defined in claim 2 wherein:

said torque receiving sections have opposing walls with grooves extending thereacross parallel to the axis of rotation of said rotor;

said brake shoes have tabs at each end thereof sized to slidably fit within said grooves;

said opposing walls contructed to receive torque exerted on said brake shoes by said rotor.

4. A brake as defined in claim 1 wherein said means for actuating said actuator wedge includes;

a pair of rollers rotatably mounted on said actuator wedge and said brake housing and being vertically aligned;

an operator wedge positioned between said rollers for engagement with said rollers;

said operator wedge being connected to a shaft extending through an opening in said brake housing.

said shaft operably connected for reciprocal movement to a driving means for driving said shaft such that said operator wedge is thrust between said rollers to force said rollers apart and thus driving said actuator wedge radially inward.

5. A brake as defined in claim 1 wherein said rotor comprises a first and second half with each half having one of said canted braking surfaces with said halves secured together by a fastener which secures said rotor to said vehicle wheel.

6. A brake as defined in claim 5 wherein:

said rotor has a plurality of heat dissipating fins positioned on each side of said rotor.

7. A brake as defined in claim 1 wherein:

said rotor has a plurality of heat dissipating fins positioned on each side of said rotor.

8. A brake for a motor vehicle comprising:

a rotor revolvably mounted with a vehicle wheel and having canted first and second braking surfaces diverging in a radial direction with respect to said rotor;

an anchored housing slidably mounting a first and second brake shoe for braking engagement with said respective first and second braking surfaces;

means for sliding said first and second brake shoes in opposite directions parallel to the axis of rotation of said rotor for engagement with said first and second braking surfaces;

said first and second braking surfaces being readially outwardly facing;

said means including an actuator wedge and actuating means for moving said actuator wedge from a radially outer to a radially inward position for sliding said brake shoes apart and into engagement with said first and second braking surfaces;

said housing having two circumferentially spaced torque receiving sections;

said actuator wedge being interposed between said torque receiving sections and being connected to a spring wire;

said spring wire having its opposite ends mounted to said respective torque receiving sections; and said spring wire being constructed to bias said actuator wedge to said radially outward position.

9. A brake as defined in claim 8 wherein said means for actuating said actuator wedge includes;

a pair of rollers rotatably mounted on said actuator wedge and said brake housing and being vertically aligned;

an operator wedge positioned between said rollers for engagement with said rollers;

said operator wedge being connected to a shaft extending through an opening in said brake housing;

said shaft operably connected for reciprocal movement to a driving means for driving said shaft such that said operator wedge is thrust between said rollers to force said rollers apart and thus driving said actuator wedge radially inward.

* * * * *